United States Patent [19]
Peters

[11] Patent Number: 6,023,531
[45] Date of Patent: Feb. 8, 2000

[54] QUANTIZATION TABLE ADJUSTMENT

[75] Inventor: Eric C. Peters, Carlisle, Mass.

[73] Assignee: Avid Technology, Inc., Tewksbury, Mass.

[21] Appl. No.: 08/881,754

[22] Filed: Jun. 24, 1997

Related U.S. Application Data

[63] Continuation of application No. 08/400,993, Mar. 15, 1994, abandoned, which is a continuation of application No. 07/807,117, Dec. 13, 1991, abandoned.

[51] Int. Cl.[7] .................................................. G06K 9/36
[52] U.S. Cl. .................................................. 382/232
[58] Field of Search .................................. 382/234, 254, 382/250, 251, 276, 279; 348/403, 405; 358/432, 433

[56] References Cited

U.S. PATENT DOCUMENTS

| | | | |
|---|---|---|---|
| Re. 34,824 | 1/1995 | Morrison et al. | 348/419 |
| 3,813,485 | 5/1974 | Arps | 178/6.8 |
| 4,191,971 | 3/1980 | Disbert et al. | 358/210 |
| 4,302,775 | 11/1981 | Widergren et al. | 358/136 |
| 4,394,774 | 7/1983 | Widergren et al. | 382/56 |
| 4,574,351 | 3/1986 | Dang et al. | 364/200 |
| 4,599,689 | 7/1986 | Berman | 364/200 |
| 4,672,441 | 6/1987 | Hoelzlwimmer et al. | 358/136 |
| 4,704,628 | 11/1987 | Chen et al. | 358/136 |
| 4,704,730 | 11/1987 | Turner et al. | 381/36 |
| 4,707,738 | 11/1987 | Ferre et al. | 358/135 |
| 4,729,020 | 3/1988 | Schaphorst et al. | 358/133 |
| 4,734,767 | 3/1988 | Kaneko et al. | 358/133 |
| 4,785,349 | 11/1988 | Keith et al. | 358/136 |
| 4,797,742 | 1/1989 | Sugiyama et al. | 358/141 |
| 4,809,067 | 2/1989 | Kikuchi et al. | 358/135 |
| 4,814,871 | 3/1989 | Keesen et al. | 358/133 |
| 4,839,724 | 6/1989 | Keesen et al. | 358/138 |
| 4,890,161 | 12/1989 | Kondo | 358/135 |
| 4,897,855 | 1/1990 | Acaompora | 375/27 |
| 4,937,685 | 6/1990 | Barker et al. | 360/14.1 |

(List continued on next page.)

FOREIGN PATENT DOCUMENTS

| | | |
|---|---|---|
| 0 323 362 A1 | 7/1989 | European Pat. Off. . |
| 0 347 330 A1 | 12/1989 | European Pat. Off. . |
| 0 469 835 A2 | 2/1992 | European Pat. Off. . |
| 2 597 282 | 10/1987 | France . |
| 2104180 | 4/1990 | Japan . |
| WO 91/14339 | 9/1991 | WIPO ............................ H04N 7/133 |
| WO92/22166 | 12/1992 | WIPO . |

OTHER PUBLICATIONS

"100Mbit/s HDTV Transmission Using a High Efficiency Codes," Y. Yashima and K. Sawada, Signal Processing of HDTV, II, L., Chiariglione (ed), Elsevier Science Publishers B.V., 1990, pp. 579–586.

"A Chip Set Core for Image Compression," A. Artieri and O. Colavin, IEEE Transactions on Consumer Electronics, vol. 36, No. 3, Aug. 1990, pp. 395–402.

"A Complete Single–Chip Implementation of the JPEG Image Compression Standard," M. Bolton et al., Proc. of the CICC, pp. 12.2.1–12.2.4, May 1991.

"A JPEG Still Picture Compression List" Tsugio Noda et al. 1991 Symposium on ULSI Circuits, pp. 33–34.

"An Encoder/Decoder Chip Set for the MPEG Video Standard," Ichiro Tamitani et al., IEEE International Conference on Acoustics, Speech and Signal Processing, ICASSP–92, vol. 5 Mar. 1992, pp. 661–664.

"Announcing a totally new concept in the field of video post production" allegedly distributed Jan. 1992.

(List continued on next page.)

*Primary Examiner*—Jose L. Couso
*Attorney, Agent, or Firm*—Kristofer E. Elbing

[57] ABSTRACT

The method for adjusting quality during image capture includes computing a discrete cosine transform of a digital image to create DCT coefficients. A quantization table is generated that specifies frequency bands to be filtered and the DCT coefficients are digitized using the quantization table. It is preferred that the DCT coefficients be ordered in a zig-zag sequence to facilitate run-length encoding.

30 Claims, 2 Drawing Sheets

U.S. PATENT DOCUMENTS

| | | | |
|---|---|---|---|
| 4,951,139 | 8/1990 | Hamilton et al. | 358/135 |
| 4,962,463 | 10/1990 | Crossno et al. | 364/518 |
| 4,982,282 | 1/1991 | Saito et al. | 358/133 |
| 4,985,766 | 1/1991 | Morrison et al. | 358/133 |
| 4,988,982 | 1/1991 | Rayner et al. | 340/706 |
| 5,021,891 | 6/1991 | Lee | 382/41 |
| 5,038,209 | 8/1991 | Hang | 358/136 |
| 5,046,119 | 9/1991 | Hoffert et al. | 382/56 |
| 5,047,853 | 9/1991 | Hoffert et al. | 358/133 |
| 5,050,230 | 9/1991 | Jones et al. | 382/56 |
| 5,061,924 | 10/1991 | Mailhot | 341/76 |
| 5,068,745 | 11/1991 | Shimura | 358/403 |
| 5,073,821 | 12/1991 | Juri | 358/135 |
| 5,107,345 | 4/1992 | Lee | 358/432 |
| 5,122,875 | 6/1992 | Raychaudhuri et al. | 358/133 |
| 5,130,797 | 7/1992 | Murakami et al. | 358/133 |
| 5,138,459 | 8/1992 | Roberts et al. | 358/209 |
| 5,146,564 | 9/1992 | Evans et al. | 395/250 |
| 5,164,980 | 11/1992 | Bush et al. | 379/53 |
| 5,168,374 | 12/1992 | Morimoto | 358/426 |
| 5,170,264 | 12/1992 | Saito et al. | 358/433 |
| 5,179,651 | 1/1993 | Taaffe et al. | 395/154 |
| 5,191,548 | 3/1993 | Balkanski et al. | 364/725 |
| 5,191,645 | 3/1993 | Carlucci et al. | 395/159 |
| 5,193,002 | 3/1993 | Guichard et al. | 358/133 |
| 5,196,933 | 3/1993 | Henoi | 358/136 |
| 5,202,760 | 4/1993 | Tourtier et al. | 358/141 |
| 5,228,028 | 7/1993 | Cucchi et al. | 370/94.1 |
| 5,228,126 | 7/1993 | Marianetti, II | 395/162 |
| 5,237,675 | 8/1993 | Hannon, Jr. | 395/425 |
| 5,253,078 | 10/1993 | Balkanski | 358/426 |
| 5,270,832 | 12/1993 | Balkanski et al. | 358/432 |
| 5,274,443 | 12/1993 | Dachiku et al. | 358/136 |
| 5,287,420 | 2/1994 | Barrett | 382/233 |
| 5,301,242 | 4/1994 | Gonzales et al. | 382/56 |
| 5,309,528 | 5/1994 | Rosen et al. | 382/58 |
| 5,329,616 | 7/1994 | Silverbrook | 395/164 |
| 5,341,318 | 8/1994 | Balkanski et al. | 364/725 |
| 5,369,505 | 11/1994 | Wantanabe et al. | 358/444 |
| 5,379,356 | 1/1995 | Purcell et al. | 382/56 |
| 5,388,197 | 2/1995 | Rayner | 395/159 |
| 5,414,796 | 5/1995 | Jacobs et al. | 395/2.3 |
| 5,577,190 | 11/1996 | Peters | 395/501 |

OTHER PUBLICATIONS

"C–Cube CL550™ Compression Monior User's Manual," Version 3.1, A Compression/Decompression Utility for Use With the C–Cube CL550 Development Board, C–Cube Microsystems, Aug. 1991, pp. 1–13.

"C–Cube CL550™ A Development Board for NuBus™," C–Cube Microsystems, Oct. 1990. Product Literature.

"C–Cube CL550 JPEG Image Compression Processor", C–Cube MicroSystems, Preliminary Data Book, Feb. Aug. 1991, pp. 1–93.

"C–Cube Microsystems Compression Workshop," C–Cube Microsystems, 1990.

"CD–1 Full–Motion Video Encoding on a Parallel Computer," F. Sijstermans and J. van der Meer. Communications of the ACM, vol. 34 No. 4, Apr. 1991 pp. 82–91.

"CenterStage Application Environment" Advertising material, Fluent Machines Inc.

"CL550 Engineering Samples (ES2 Revision) Bug List" C–Cube Microsystems, Product Marketing Feb., 1991.

"CL550 Errata Information," C–Cube Product Marketing Literature, Nov. 1990.

"CL550 Reference Streams," C–Cube MicroSystems Technical Note.

"CL550A JPEG Image Compression Processor", C–Cube MicroSystems, Preliminary Data Book, Feb. 1990, pp. 1–36.

"Compression Monitor Software (Version 2.0) User's Manual," C–Cube Microsystems, pp.

"Compressor/Decompressor (CODEC)," Advertising Literature Fluent Machines Inc.

"DigiCipher™—All Digital Channel Compatible HDTV Broadcast System," W. Palk IEEE Trans. on Broadcasting, vol. 36, No. 4, Dec. 1990.

"Digital Pictures, Representation and Compression," A, N. Netravlj and B. G. Haskell, Plenum Press, New York, Jun. 1989, pp. 301–551.

"Features Sets for Interactive Images," A. Lippman, Communications of the ACM, vol. 34 No. 4, Apr. 1991, pp. 93–102.

"Fluent Multimedia Extending the Capabilities of DVI," Advertising material, Fluent Machines Inc.

"FM/1 Multimedia Development System," Advertising material, Fluent Machines Inc.

"IC801 Single–Chip Px64 Codec For Video Phones" Preliminary Information, InfoChip Systems Incorporated, Mar. 1992, pp. 1–12.

"Interframe Adaptive Data Compression Technique for Images," J.R. Jain & A.K. Jain Signal and Image Image Image Processing Lab., Dept. of Electrical and Computer Eng. Univ. of California, Davis. Aug. 1979, pp. 1–177.

"L64735 Discrete Cosine Transform Processor," LSI Logic Corporation, Jan. 1991.

"L64745 JPEG Coder," LSI Logic Corporation Jan. 14, 1991, pp. 1–14.

"Monolithic Circuits Expedite Desktop Video," D. Pryce, Electrical Design News, vol. 36, No. 22, Oct. 1991, Newton, MA, pp. 67, 69, 74 and 76.

"Multimedia Group Strategy and Media 100™ Backgrounder" dated Feb. 1992.

News Release entitled "Media 100™—Industry's First Online, Nonlinear Video Production System Introduced by Data Translation's Multimedia Group" dated Jan. 11, 1992.

"NeXTstep; Putting JPEG to Multiple Uses," G. Cockroft and L. Hourvitz Communications of the ACM Apr. 1991, vol. 34, No. 4, pp. 45 and 116.

"OBRAZ 1/Caractéristiques Générales," Advertising material MACSYS (with translation).

"OBRAZ Explication succincte" Advertising material MACSYS (with translation).

"Overview of the px64 kbit/s Video Coding Standard," M. Liou, Communications of the ACM, vol. 34, No. 4, Apr. 1991, pp. 60–63.

Proceedings of the 1983 International Zurich Seminar on Digital Communications, Lohscheller, H. March 1984, pp. 25–31.

"Silicon Solution Merges Video, Stills and Voice", Milt Lenoard, Electronic Design Apr. 2.

Technical Notes Mar. 1990 C–Cube Microsystems, 1990.

"The C–Cube CL550 JPEG Image Compression Processor," S. C. Purcell, IEEE Computer Society International Conference, 1991, pp. 318–323.

"Toward an Open Environment for Digital Video," M. Liebhold and E. M. Hoffert. Communications of the ACM, vol. 34, No. 4, Apr. 1991 pp. 104–112.

U.S. Serial No. 08/048,458.

U.S. Serial No. 08/048,782.

"Video Compression Chip Set," LSI Logic Corporation, pp. 1–16.

"Video Compression Chipset Attacks High Multimedia Price Tags," LSI Logic Corporation.

Wallace, G.K., "The JPEG Still Picture Compression Standard," Communications of the Association for Computing Machinery, vol. 34, No. 4, pp. 30–34, Apr. 1991.

Kiesen, et al., "Coding of Color Televsion Signals Using a Modified M–Transform for 34 MBit/s–Transmission", Frequenz, vol. 38, No. 10, Oct. 1984, with translation, pp. 1–7.

Tasto et al., "Image Coding by Adaptive Block Quantization," IEEE Transactions on Communication Technology, vol. COM–19, No. 6, Dec. 1971, pp. 957–972.

Lohscheller, H., Proceedings of the 1983 International Zurich Seminar on Digital Communications, Mar. 1984, pp. 25–31.

Goetze, M., "Combined Soure Channel Coding in Adaptive Transform Coding Systems for Images," Proceedings of the IEEE International Conference on Communications, May 1984, vol. 1, pp. 511–515.

Chantelou et al., "Adaptive Transform Coding of HDTV Pictures," Signal Processing of HDTV, Proceedings of the Second International Workshop on Signal Processing of HDTV, L'Aquila, Feb. 29th –Mar. 2, 1988, pp. 231–238. 1984.

S.M.C. Borgers et al, "An Experimental Digital VCR With 40mm Drum, Single Actuator and DCT–Based Bit–Rate Reduction," IEEE Trans. on Consumer Electronics, vol. 34, No. 3, 1988.

QUANTIZATION TABLE ADJUSTMENT

This application is a continuation of application Ser. No. 08/400,993, filed Mar. 15, 1994, now abandoned which is a continuation of Ser. No. 07/807,117 filed Dec. 13, 1991 now abandoned.

BACKGROUND OF THE INVENTION

This invention relates to hardware designs coupled with software-based algorithms for capture, compression, decompression, and playback of digital image sequences, particularly in an editing environment.

The idea of taking motion video, digitizing it, compressing the digital datastream, and storing it on some kind of media for later playback is not new. RCA's Sarnoff labs began working on this in the early days of the video disk, seeking to create a digital rather than an analog approach. This technology has since become known as Digital Video Interactive (DVI).

Another group, led by Phillips in Europe, has also worked on a digital motion video approach for a product they call CDI (Compact Disk Interactive). Both DVI and CDI seek to store motion video and sound on CD-ROM disks for playback in low cost players. In the case of DVI, the compression is done in batch mode, and takes a long time, but the playback hardware is low cost. CDI is less specific about the compression approach, and mainly provides a format for the data to be stored on the disk.

A few years ago, a standards-making body known as CCITT, based in France, working in conjunction with ISO, the International Standards Organization, created a working group to focus on image compression. This group, called the Joint Photographic Experts Group (JPEG) met for many years to determine the most effective way to compress digital images. They evaluated a wide range of compression schemes, including vector quantization (the technique used by DVI) and DCT (Discrete Cosine Transform). After exhaustive qualitative tests and careful study, the JPEG group picked the DCT approach, and also defined in detail the various ways this approach could be used for image compression. The group published a proposed ISO standard that is generally referred to as the JPEG standard. This standard is now in its final form, and is awaiting ratification by ISO, which is expected.

The JPEG standard has wide implications for image capture and storage, image transmission, and image playback. A color photograph can be compressed by 10 to 1 with virtually no visible loss of quality. Compression of 30 to 1 can be achieved with Ross that is so minimal that most people cannot see the difference. Compression factors of 100 to 1 and more can be achieved while maintaining image quality acceptable for a wide range of purposes.

The creation of the JPEG standard has spurred a variety of important hardware developments. The DCT algorithm used by the JPEG standard is extremely complex. It requires converting an image from the spatial domain to the frequency domain, the quantization of the various frequency components, followed by Huffman coding of the resulting components. The conversion from spatial to frequency domain, the quantization, and the Huffman coding are all computationally intensive. Hardware vendors have responded by building specialized integrated circuits to implement the JPEG algorithm.

One vendor, C-Cube of San Jose, Calif., has created a JPEG chip (the CL550B) that not only implements the JPEG standard in hardware, but can process an image with a resolution of, for example, 720×488 pixels (CCIRR 601 video standard) in just 1/30th of a second. This means that the JPEG algorithm can be applied to a digitized video sequence, and the resulting compressed data can be stored for Rater playback. The same chip can be used to compress or decompress images or image sequences. The availability of this JPEG chip has spurred computer vendors and system integrators to design new products that incorporate the JPEG chip for motion video. However, the implementation of the chip in a hardware and software environment capable of processing images with a resolution of 640×480 pixels or greater at a rate of 30 frames per second in an editing environment introduces multiple problems.

It is often desirable to vary the quality of an image during compression in order to optimize the degree of data compression. For example, during some portions of a sequence, detail may not be important, and quality can be sacrificed by compressing tie data to a greater degree. Other portions may require greater quality, and hence this greater degree of compression may be unsuitable. In prior implementations of the JPEG algorithm, quality is adjusted by scaling the elements of a quantization table (discussed in detail hereinbelow). If these elements are scaled during compression, they must be correspondingly re-scaled during decompression in order to obtain a suitable image. This re-scaling is cumbersome to implement and can cause delays during playback. The present invention is a method that allows for quality changes during compression to enable optimum data compression for all portions of a sequence, while allowing playback with a single quantization table.

SUMMARY OF THE INVENTION

This invention relates to an apparatus and method for adjusting the post decompression quality of a compressed image. The image quality adjustment is performed by constructing a quantization table that specifies the high frequency image components to be filtered, and by subsequently filtering out those components specified by the table.

DESCRIPTION OF THE PREFERRED EMBODIMENT

Figure 1:
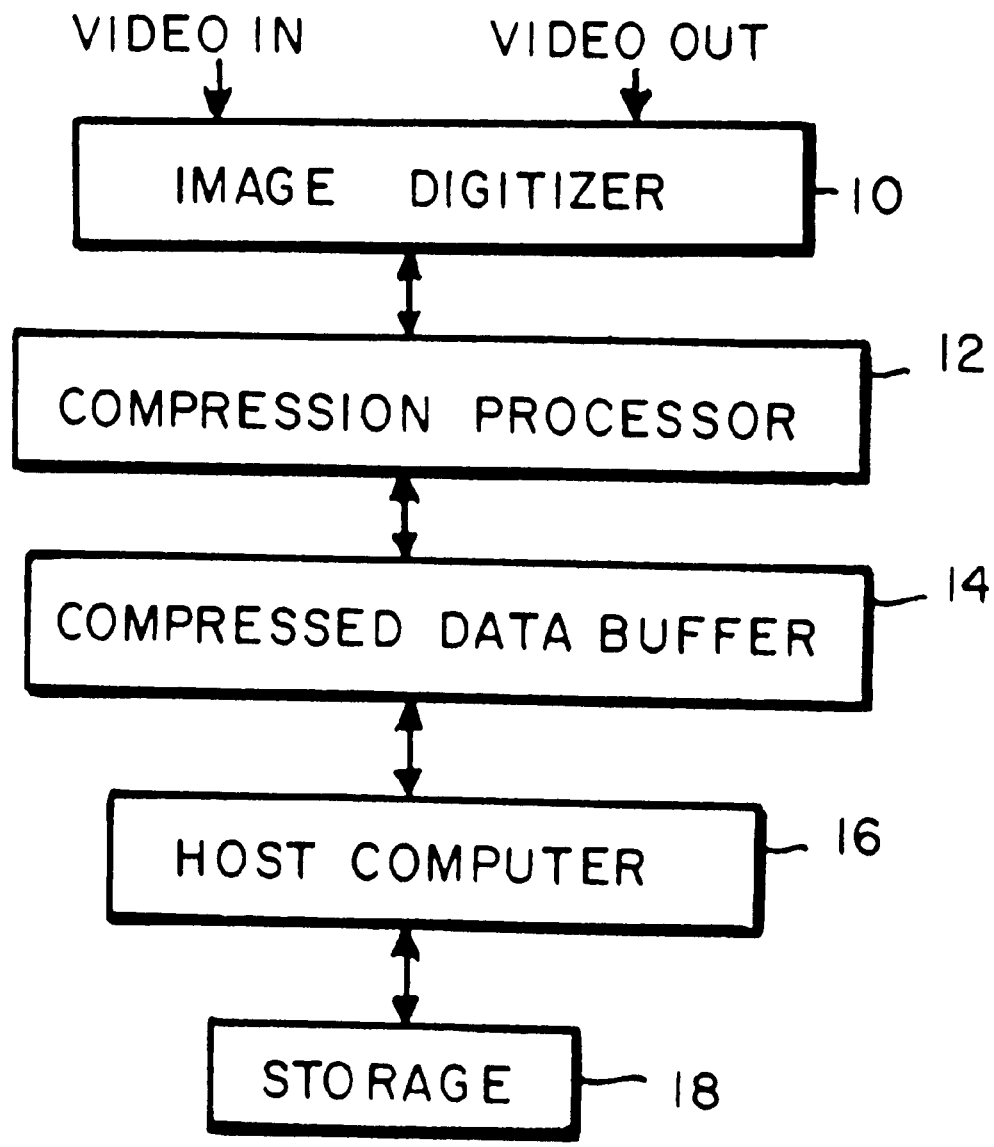
FIG. 1 is a block diagram of a video image capture and playback system implementing data compression.

A block diagram according to a preferred embodiment of a system for capture, compression, storage, decompression, and playback of images is illustrated in FIG. 1.

As shown, an image digitizer (frame grabber) 10, captures and digitizes the images from an analog source, such as videotape. Image digitizer 10 may be, for example, a True-Vision NuVista+ board. However, the NuVista+ board is preferably modified and augmented with a pixel engine as described in copending application "Image Digitizer Including Pixel Engine" by B. Joshua Rosen et al., filed Dec. 13, 1991, to provide better data throughput for a variety of image formats and modes of operation.

The compression processor 12 compresses the data according to a compression algorithm. Preferably, this algorithm is the JPEG algorithm, introduced above. As discussed above, C-Cube produces a compression processor (CL550B) based on the JPEG algorithm that is appropriate for use as compression processor 12. However, other embodiments are within the scope of the invention. Compression processor 12 may be a processor that implements the new MPEG (Motion Picture Experts Group) algorithm, or a processor that implements any of a variety of other image compression algorithms known to those skilled in the art.

The compressed data from the processor 12 is preferably input to a compressed data buffer 14 which is interfaced to host computer 16 connected to disk 18. The compressed data buffer 14 preferably implements a DMA process in order to absorb speed differences between compression processor 12 and disk 18, and further to permit data transfer between processor 12 and disk 18 with a single pass through the CPU of host computer 16. The host computer 16 may be, for example, an Apple Macintosh.

JPEG Encoding and Decoding

Detailed discussions of the JPEG algorithm and its implementation are contained in "The JPEG Still Picture Compression Standard" by G. K. Wallace, in Communications of the ACM, Vol. 34, April 1991, and in "Digital Compression and Coding of Continuous-Tone Still Images, Part 1, Requirements and Guidelines," ISO/IEEC JTC1 Committee Draft 10918-1, February, 1991, both of which are incorporated herein by reference.

Figure 2:
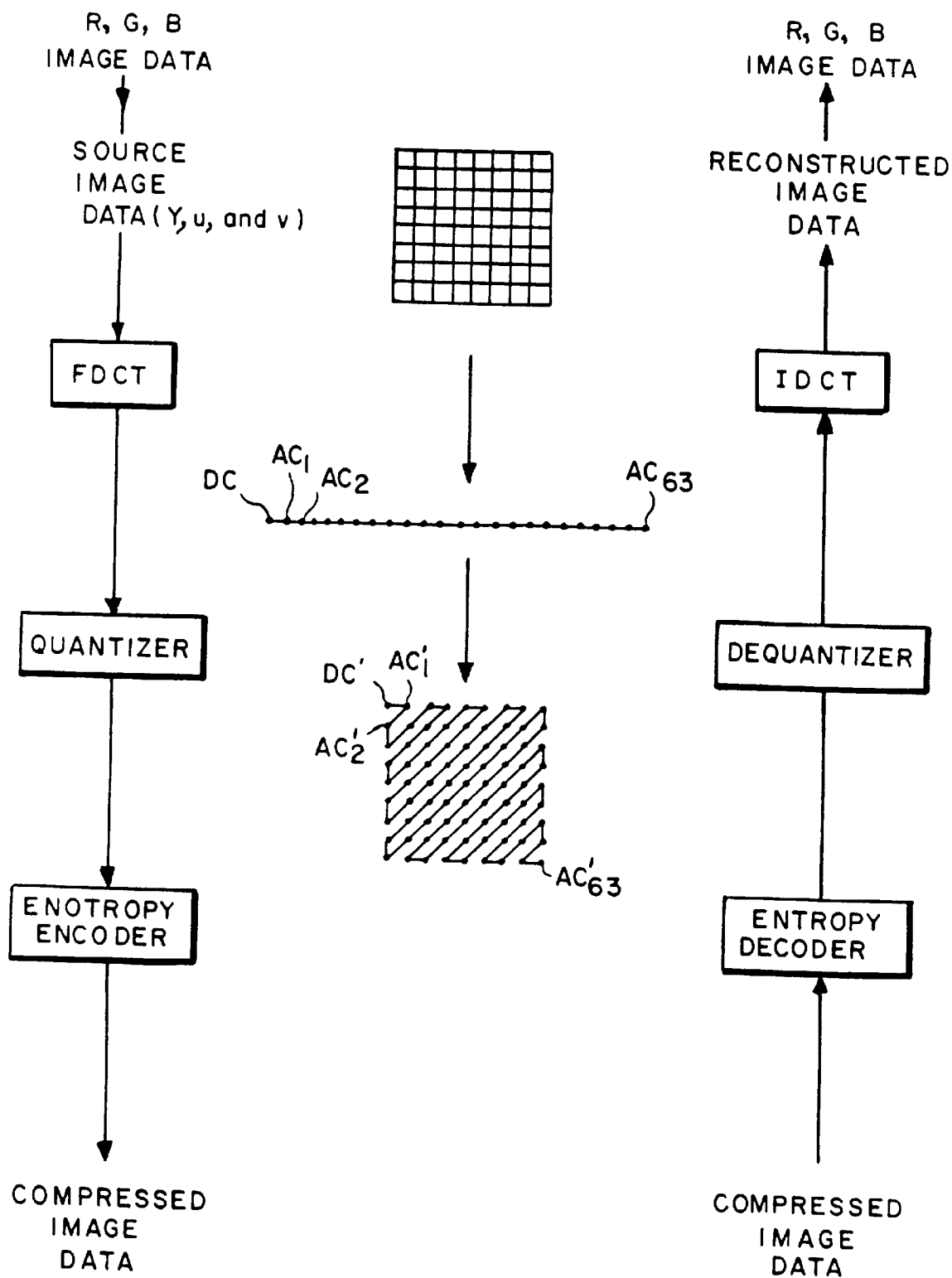
FIG. 2 is a schematic illustration of data compression and decompression according to the JPEG algorithm.

FIG. 2 illustrates the key steps in data compression and decompression according to the JPEG algorithm for a single component of what will generally be a three-component image. In the JPEG standard, an image described in the RGB color space will be transformed into the YUV color space via a 3×3 multiplier prior to compression. This conversion sacrifices some color information, but preserves the more important detail information.

The algorithm works with blocks of 8×8 pixels from the image. Each 8×8 block is input to the compressor, goes through the illustrated steps, and the compressed data is output as a data stream.

The first step in the JPEG algorithm is a Forward Discrete Cosine Transform (FDCT). As described in Wallace, cited above, each 8×8 block of pixels can be thought of as a 64-point discrete signal which is a function of two spatial dimensions. The FDCT computes the "spectrum" of this signal in the form of 64 two-dimensional "spatial frequencies," termed DCT coefficients. The DCT coefficients represent the relative amounts of the two-dimensional spatial frequencies contained in the 64-point discrete signal. The coefficient with zero frequency in both dimensions is called the "DC coefficient" and the remaining 63 coefficients are called the "AC coefficients." Typically each pixel component corresponds to 8 bits, as is the case in 24 bit color. According to the JPEG algorithm, each coefficient is described by greater than 8 bits. In the C-Cube chip discussed above, the number of bits per coefficient is 12. Therefore, at this point, the algorithm has actually led to am expansion, rather than a compression of data. However, since pixel values usually vary slowly across an image, most of the pixel information will be contained in the lower spatial frequencies. For typical 8×8 pixel blocks, most of the spatial frequencies at the high end of the spectrum will have zero or negligible amplitude. Data compression can then be achieved by "throwing out" these coefficients, which is the purpose of the next step.

The next step in the JPEG algorithm is quantization, wherein each of the 64 DCT coefficients is quantized in accordance with a 64-element quantization table. This table is specified by the user. The C-Cube chip allows user adjustability of this table via software inputs to the chip.

Each element in the table is any integer from 1 to 255, according to the JPEG standard. Each element is the quantizer step size for a corresponding DCT coefficient. Quantization is achieved by dividing each DCT coefficient by its corresponding quantizer step size, and rounding to the nearest integer, a very lossy process. The elements of the table are chosen so that the generally large lower frequency components are represented by a smaller number of bits, and the negligible higher frequency components become zero. The goal is to represent each DCT coefficient by no more precision than is necessary for a desired image quality. Since the coefficients, therefore, depend on human visual parameters, the table is sometimes called a psycho-visual weighing table.

Compression is achieved by the use of run-length encoding, which puts an end-of-block code at the start of the sequence of zeros that will typically form the end of the 64 coefficient string. The zeros, therefore, don't contribute to the length of the data stream.

After the coefficients have been quantized, they are ordered into a "zig-zag" sequence, as illustrated in FIG. 2. This sequence facilitates the run-length encoding. Before going on to this step, it should be noted, that since the DC coefficient is generally one of the largest coefficients, and furthermore since it is a measure of the average value of the 64 pixels in the 8×8 block, there is generally a strong correlation between the DC coefficients of adjacent blocks, and therefore, the DC component is encoded as the difference from the DC term of the previous block in the compression order.

The final step is entropy coding, wherein additional compression is achieved by encoding the quantized DCT coefficients according to their statistical characteristics. This is a lossless step. As this step is not as relevant to the methods of the present invention as those of the previous steps, the reader is referred to Wallace, cited above for a detailed discussion.

The above steps are essentially reversed, as illustrated in FIG. 1*b*, during playback. Here too, the reader is referred to Wallace for further details.

From the above discussion, it can be seen that image quality can be adjusted by scaling the values of the quantization table. For higher quality images, the elements should be small, since the larger the elements, the greater the loss.

In prior art systems, this is precisely the technique used to adjust image quality during image capture. A variable quality scaling factor (1–255) called the quantization factor or Q-factor is used with JPEG to adjust the degree of quantization of the compressed image. For sequences requiring high quality, low Q-factors are used. For sequences in which quality can be sacrificed, high Q-factors are used. It can be imagined that a user may want to continuously adjust the quality over the range of the Q-factor at the time of capture as scenes change.

The problem with the above method is that if the quantization table values are scaled during image capture, they must be correspondingly descaled during image playback. To illustrate the importance of this, imagine the result if the quantization table element corresponding to the DC coefficient is multiplied by a factor of 10 at some point during image capture in an effort to increase the degree of data compression. If at playback, the original quantization table is used (prior to the upward scaling), the DC coefficient will be 10 times too small. Since the DC component primarily corresponds to brightness, the result is dramatic.

The method of the present invention is an alternate method for adjusting quality during image capture which permits playback using a single quantization table. According to the invention, the DCT coefficients are filtered during image capture according to the following technique.

As has already been discussed, the DC coefficient is the most important in terms of human perception. The higher the frequency of a coefficient, the finer the detail it describes in an image. Humans are much less sensitive to these high frequency components. Therefore, according to the invention, if image quality is to be lowered to further compress the data, the high frequency components are filtered out. The cut-off frequency of the filter determines the degree of compression. This method is in clear contradistinction to the prior method of adjusting the Q-factor.

As described above and illustrated in FIG. 2, the coefficients are sequenced in a zig-zag pattern as part of the quantization step. A filter according to one embodiment of the invention can be characterized as a diagonal line indicating the cutoff frequency. The effect of throwing out the higher frequency components is a blur of the image to an extent determined by the cutoff frequency. This artifact is often acceptable, depending on the scene and the quality required.

Furthermore, the artifact caused by the filtering can be made more tolerable to the eye by adjusting the filter in the following manner. If in addition to throwing out all frequency components above cutoff, the frequency components just below cutoff are muted, the artifact is made less harsh.

The filter described above can be created by hand-creating quantization tables. For all frequencies above cutoff, the table elements should be large, preferably as large as possible without overflowing the arithmetic of the system. For frequencies below cutoff, the table elements can be exactly as used in standard JPEG implementations. However, preferably, the table elements below but near cut-off are increased by some amount to mute the corresponding frequency components as described above. Preferably, this muting is greatest at cutoff, decreasing as the DC coefficient is approached.

The filter can be easily adjusted during image capture to control the degree of data compression by changing the quantization table. In one mode of operation, the filter is user adjusted. However, in another mode of operation, the filter may be automatically adjusted by the system when it senses bottlenecks forming. The interrupt routine gets activated on each frame. It computes the current frame size and compares it with the desired target size, then it adjusts the table by moving the filter cut-off frequency to approach the target.

As stated above, the invention was developed as a method for adjusting quality during image capture in such a way that playback can take place in the absence of the history of such adjustment. It should be clear that this is achieved when the images are played back using the original quantization tables. This is because only the least important coefficients are affected by the filtering. In contrast, in the prior methods for quality adjustment, all coefficients were affected to the same degree.

Subsampling introduces artifacts called aliases to the signal. These frequencies can be predicted and removed by increasing the Q table entries for them.

What is claimed is:

1. A method for compressing digitized signals digitized by a digitizer, comprising the steps of:
    computing a discrete cosine transform of a first plurality of the signals to create a first plurality of coefficients corresponding to frequencies;
    specifying a cutoff frequency above which the first plurality of the computed coefficients are to be eliminated;
    creating a first quantization table including a first plurality of table values indicative of the cutoff frequency, each table value corresponding to one of a plurality of frequencies;
    quantizing the first plurality of computed coefficients using the first quantization table and outputting compressed signals;
    computing a discrete cosine transform of a second plurality of the signals to create a second plurality of coefficients corresponding to the frequencies;
    adjusting the cutoff frequency above which the second plurality of the computed coefficients are to be eliminated;
    creating a second quantization table including a second plurality of table values indicative of the cutoff frequency after the step of adjusting, wherein each of the second plurality of table values corresponds to one of the plurality of frequencies, and wherein at least some of the values in the first table that correspond respectively to a subset of the frequencies are different from at least some of the values in the second table that correspond respectively to the same subset of the frequencies;
    quantizing the second plurality of computed coefficients using the second table and outputting further compressed signals; and
    decompressing the compressed signals that were compressed according to the first table and decompressing the further compressed signals that were compressed according to the second table using a same table.

2. The method of claim 1, wherein the step of creating includes setting the table values below the cutoff frequency to predetermined values, to mute the effects of eliminating the computed coefficients above the cutoff frequency.

3. The method of claim 1 wherein the steps of computing and the steps of quantizing operate in accordance with the JEPG standard.

4. An apparatus for compressing digitized image signals digitized by a digitizer, comprising:
    means for receiving the signals, for computing an orthogonal transform of the signals and for outputting a plurality of coefficients corresponding to frequencies;
    means for creating a quantization table including a plurality of table values indicative of a cutoff frequency above which the computed coefficients are to be eliminated, each table value corresponding to a frequency;
    means for adjusting the cutoff frequency to create a quantization table including a different plurality of table values indicative of a different frequency above which computed coefficients are to be eliminated;
    means for receiving the plurality of coefficients and for quantizing the plurality of coefficients using the quantization table values; and
    means for decompressing the image signals processed by the means for receiving and the means for quantizing, the means for decompressing using a sample table independent of adjustment by the means for adjusting to create the different plurality of table values for the images to be decompressed.

5. The apparatus of claim 4 wherein the means for receiving and quantizing operate in accordance with the JEPG standard.

6. An apparatus for compressing signals representative of multidimensional physical data comprising:

an orthogonal transformer which receives the signals, computes an orthogonal transform of the signals and outputs a plurality of transform coefficients corresponding to frequencies; and a quantizer including:
  an input for receiving the plurality of computed coefficients;
  a quantization table comprising a plurality of table values including table values indicative of a cutoff frequency above which the computed coefficients are to be eliminated, and each table value corresponding to a frequency;
  means for adjusting the quantization table to be indicative of an adjusted cutoff frequency, wherein the step of adjusting the quantization table changes values in the table that correspond to at least one of the frequencies; and
a decompressor for decompressing the image signals compressed by the transformer and the quantizer using a same table independent of tables value changes due to adjustment by the means for adjusting.

7. The apparatus of claim 6 wherein the orthogonal transformer operates in accordance with the JEPG standard.

8. A method for compressing signals representative of a series of two-dimensional images, comprising:
  receiving signals representative of a first of the images,
  transforming the signals of the first of the images to obtain lower frequency coefficients below a cut-off frequency and higher frequency coefficients above the cut-off frequency,
  quantizing the coefficients obtained in the step of transforming, the step of quantizing including the steps of:
    reducing the precision of the lower frequency coefficients,
    reducing the higher frequency coefficients to zero,
  adjusting the cut-off frequency,
  receiving signals representative of a second of the images,
  transforming the signals representative of the second of the images to obtain further lower frequency coefficients below the adjusted cut-off frequency and further higher frequency coefficients above the cut-off frequency,
  quantizing the coefficients obtained in the step of transforming the signals representative of the second of the images, the step of quantizing including the steps of:
    reducing the precision of the further lower frequency coefficients,
    reducing the further higher frequency coefficients to zero, wherein the step of reducing the higher frequency coefficients to zero and the step of reducing the further higher frequency coefficients to zero operate on different numbers of coefficients, and wherein the step of reducing the precision of the lower frequency coefficients and the step of reducing the precision of the further lower frequency coefficients operate on different numbers of coefficients, and
  decompressing the first and second images using a same quantization table.

9. The method of claim 8, wherein the steps of quantizing mute the frequency components just below the cut-off frequency.

10. The method of claim 8, further including the step of digitizing the images to obtain the signals representative of the images.

11. The method of claim 10, wherein the steps of transforming and the steps of quantizing operate in accordance with the JEPG standard.

12. The method of claim 11, wherein the steps of quantizing mute the frequency components just below the cut-off frequency.

13. The method of claim 8, further including the step of digitizing the images to obtain the signals representative of the images.

14. The method of claim 8, wherein the steps of transforming and the steps of quantizing operate in accordance with the JEPG standard.

15. Apparatus for compressing signals representative of a series of two-dimensional images, comprising:
  means for receiving signals representative of a first and a second of the images,
  means for transforming the signals of the first and the second of the images to obtain lower frequency coefficients below a cut-off frequency and higher frequency coefficients above the cut-off frequency,
  means for quantizing the coefficients obtained from the means for transforming, the means for quantizing including:
    means for reducing the precision of the lower frequency coefficients, the means for reducing the precision being operative to reduce the precision of different numbers of coefficients based on the cut-off frequency,
    means for reducing the higher frequency coefficients to zero, the means for reducing the higher frequency coefficients to zero being operative to reduce different numbers of coefficients to zero based on the cut-off frequency, and
  means for adjusting the cut-off frequency between the quantizing of the first and second images, and
  means for decompressing the first and second images using a same quantization table, despite changes in the number of coefficients whose precision was reduced and changes in the number of coefficients reduced to zero.

16. The apparatus of claim 15, wherein the means for quantizing is constructed and adapted to mute the frequency components just below the cut-off frequency.

17. The method of claim 15, further including means for digitizing the images to obtain the signals representative of the images.

18. The method of claim 17, wherein the means for transforming and the means for quantizing operate in accordance with the JEPG standard.

19. The apparatus of claim 18, wherein the means for quantizing is constructed and adapted to mute the frequency components just below the cut-off frequency.

20. The method of claim 15, further including means for digitizing the images to obtain the signals representative of the images.

21. The method of claim 15, wherein the means for transforming and the means for quantizing operate in accordance with the JEPG standard.

22. An apparatus for compressing signals representative of a series of two-dimensional images, comprising:
  an orthogonal transformer which receives the signals, computes an orthogonal transform of the signals and outputs a plurality of transform coefficients corresponding to frequencies,
  a quantizer including a quantization table comprising a plurality of table values including table values indicative of a cutoff frequency above which the transform coefficients are to be reduced to zero, means for adjusting the quantization table to be indicative of an adjusted cutoff frequency, wherein the means or adjusting the quantization table is operative to change values in the table that correspond to at least one of the frequencies, and dequantizer constructed and adapted to dequantize the series of images using a same quantization table independent of tables value changes due to adjustment by the means for adjusting between quantization steps for the series of images.

23. The apparatus of claim 22, wherein the quantizer mutes the frequency components just below the cut-off frequency.

24. The apparatus of claim 22, further including a digitizer for digitizing the images to obtain the signals representative of the images.

25. The method of claim 24, wherein the transformer and the quantizer operate in accordance with the JEPG standard.

26. The apparatus of claim 25, wherein the quantizer mutes the frequency components just below the cut-off frequency.

27. The apparatus of claim 22, further including a digitizer for digitizing the images to obtain the signals representative of the images.

28. The method of claim 22, wherein the transformer and the quantizer operate in accordance with the JEPG standard.

29. A method for adjusting an amount of compression of a plurality of digitized image signals digitized by a digitizer, comprising the steps of:

computing an orthogonal transform of a first plurality of the signals to create a first plurality of coefficients corresponding to frequencies;

creating an original quantization table including a plurality of table values indicative of a cutoff frequency, each of the table values corresponding to a frequency;

quantizing the first plurality of computed coefficient using the quantization table and outputting a first plurality of compressed signals;

computing an orthogonal transform of a second plurality of the signals to create a second plurality of coefficients corresponding to the frequencies;

adjusting the cutoff frequency and the original quantization table values to obtain adjusting quantization table values to control the amount of compression of the compressed signals, wherein at least some of the values in the original table that correspond respectively to a subset of the frequencies are different from at least some of the values in the adjusted table that correspond respectively to the same subset of the frequencies;

quantizing the second plurality of computed coefficients using the quantization table after the step of adjusting, and outputting a second plurality of compressed signals; and decompressing both the first and second pluralities of compressed signals using a same table.

30. The method of claim 29, wherein the digitized image signals are reconstructed from the compressed signals using the original quantization table as the same table.

* * * * *

UNITED STATES PATENT AND TRADEMARK OFFICE
CERTIFICATE OF CORRECTION

PATENT NO : 6,023,531

DATED : February 8, 2000

INVENTOR(S) : Eric C. Peters

It is certified that error appears in the above-identified patent and that said Letters Patent is hereby corrected as shown below:

Column 1, line 50, where "Ross" should read --loss--;

Column 2, line 5, where "Rater" should read --later--;

Column 2, line 18, where "tie" should read --the--;

Column 3, line 23, where "ISO/IEEC should read --ISO/IEC--;

Column 3, line 54, where "am" should read --an--;

Column 4, line 39, after which there should be a centered subtitle reading "Image Quality Adjustment"

Column 6, line 59, where "sample" should read --same--;

Column 9, line 4, where --means of-- should read "means for";

Column 9, line 8, where --a-- should be inserted before "dequantizer"; and

Column 10, line 14, where "adjusting" should read --adjusted--.

Signed and Sealed this

Twenty-seventh Day of March, 2001

Attest:

NICHOLAS P. GODICI

Attesting Officer

Acting Director of the United States Patent and Trademark Office